United States Patent [19]

Woelfel et al.

[11] Patent Number: 4,583,933

[45] Date of Patent: Apr. 22, 1986

[54] MOLD FOR FORMING A FIBER REINFORCED COMPOSITE WHEEL CONSTRUCTION

[75] Inventors: James A. Woelfel; Richard W. Smith, both of Lansing, Mich.

[73] Assignee: Motor Wheel Corporation, Lansing, Mich.

[21] Appl. No.: 685,448

[22] Filed: Dec. 24, 1984

Related U.S. Application Data

[60] Division of Ser. No. 559,623, Dec. 12, 1983, Pat. No. 4,514,013, which is a continuation of Ser. No. 277,657, Jun. 26, 1981, abandoned, which is a division of Ser. No. 119,128, Feb. 6, 1980, Pat. No. 4,294,639, which is a continuation-in-part of Ser. No. 14,265, Feb. 11, 1979, abandoned.

[51] Int. Cl.$^4$ ............................................. B29C 43/00
[52] U.S. Cl. ................................. 425/330; 425/383; 425/406; 425/450.1; 425/438; 425/441; 249/56
[58] Field of Search ............... 425/46, 47, 190, 330, 425/450.1, 451.9, 383, 406, 441, 438; 264/275; 249/56; 301/63 PW

[56] References Cited

U.S. PATENT DOCUMENTS

| | | | |
|---|---|---|---|
| 3,042,966 | 7/1962 | Laycox | 425/46 |
| 3,968,996 | 7/1976 | Wilcox | 301/63 PW |
| 4,022,554 | 5/1977 | MacMillan | 425/46 |
| 4,140,454 | 2/1979 | Calori | 425/190 |
| 4,198,372 | 4/1980 | Calori | 425/47 |
| 4,401,502 | 8/1983 | Schmidt | |

FOREIGN PATENT DOCUMENTS

| | | | |
|---|---|---|---|
| 2529901 | 2/1977 | Fed. Rep. of Germany | 425/47 |
| 2306070 | 2/1975 | France | 425/46 |

*Primary Examiner*—Willard E. Hoag
*Attorney, Agent, or Firm*—Barnes, Kisselle, Raisch, Choate, Whittemore & Hulbert

[57] ABSTRACT

Apparatus for molding a fiber-reinforced wheel construction having an imperforate disc structure. The wheel comprises a disc portion having reinforcing fibers in substantially random orientation disposed predominantly in planes perpendicular to the wheel axis, and a rim portion having directional first reinforcing fibers substantially parallel to each other and oriented circumferentially of or substantially parallel to the wheel axis, or both, and second reinforcing fibers which are substantially randomly oriented circumferentially of the wheel axis. An apparatus for molding the wheel features radially movable rim mold sections and axially reciprocable disc mold sections all having mold surface contours for forming a molded composite wheel of desired configuration.

6 Claims, 23 Drawing Figures

BEAD TO BEAD

MOLD FOR FORMING A FIBER REINFORCED COMPOSITE WHEEL CONSTRUCTION

This application is a division of application Ser. No. 06/559,623, filed Dec. 12, 1983 now U.S. Pat. No. 4,514,013, which was a continuation of application Ser. No. 277,657, filed June 26, 1981, now abandoned, which was a division of application Ser. No. 119,128, filed Feb. 6, 1980, now U.S. Pat. No. 4,294,639, which was a continuation-in-part of application Ser. No. 14,265, filed Feb. 11, 1979, now abandoned.

The present invention is generally directed to vehicle wheels and methods for fabrication thereof, and more particularly to methods for fabricating fiber-reinforced composite wheels and the resulting product.

As utilized herein, the terms "composite wheel" and "fiber-reinforced composite wheel" refer to a wheel construction of fiber-reinforced plastic resin.

A general object of the present invention is to provide a vehicle wheel which has the strength and durability of conventional steel wheels but is lighter in weight and yet economical to manufacture.

More specific objects of the invention are to provide a method of constructing a fiber-reinforced composite wheel in which reinforcing fibers are disposed and selectively oriented in the wheel rim and disc portions for enhanced durability and strength, and/or which is more economical to carry out than are the reinforced plastic wheel construction techniques proposed in the prior art. A further object of the invention is to provide an apparatus for constructing a wheel in accordance with such method. Another object of the invention is to provide a fiber-reinforced composite wheel constructed in accorcdance with such method.

A further object of the invention is to provide a method of molding fiber-reinforced composite wheels which minimizes flow and knit line formation during the molding process, particularly in the rim flange area and around wheel disc discontinuities such as bolt and hand holes.

The invention, together with additional objects, features and advantages thereof, will be best understood from the following description, the appended claims and the accompanying drawings in which:

In general, the present invention contemplates a fiber-reinforced molded resin wheel and method of construction wherein the wheel rim and disc portions are formed from respective separate mold charges of sheet molding compound. The separately formed charges are molded into an integral composite rim and disc structure of essentially homogeneous resin reinforced by the fibers. The disc charge preferably comprises a stack of precut sheet sections. The reinforcing fibers in the disc charge and in the final disc wheel portion are in substantially random orientation essentially in planes perpendicular to the wheel axis with each such plane corresponding to a layer of reinforcing fibers in the starting sections of sheet molding compound.

The rim charge preferably comprises one or more lengths of precut sheet molding compound coiled to form a spiral or hoop having at least one layer. The sheet layers in the rim charge hoop are referred to herein as spiral plies. Preferably, the reinforcing fibers in the rim charge hoop and in the final rim wheel portion include at least first fibers oriented substantially randomly of the rim circumference and second directional fibers in one or more selected orientations with respect to the wheel axis and circumference. In various specific embodiments to be described, the directional fibers are oriented in parallel axially or circumferentially of the wheel axis. In other embodiments, the directional fibers are in a double helical array forming an X-like pattern transverse to the wheel rim.

Figure 1:
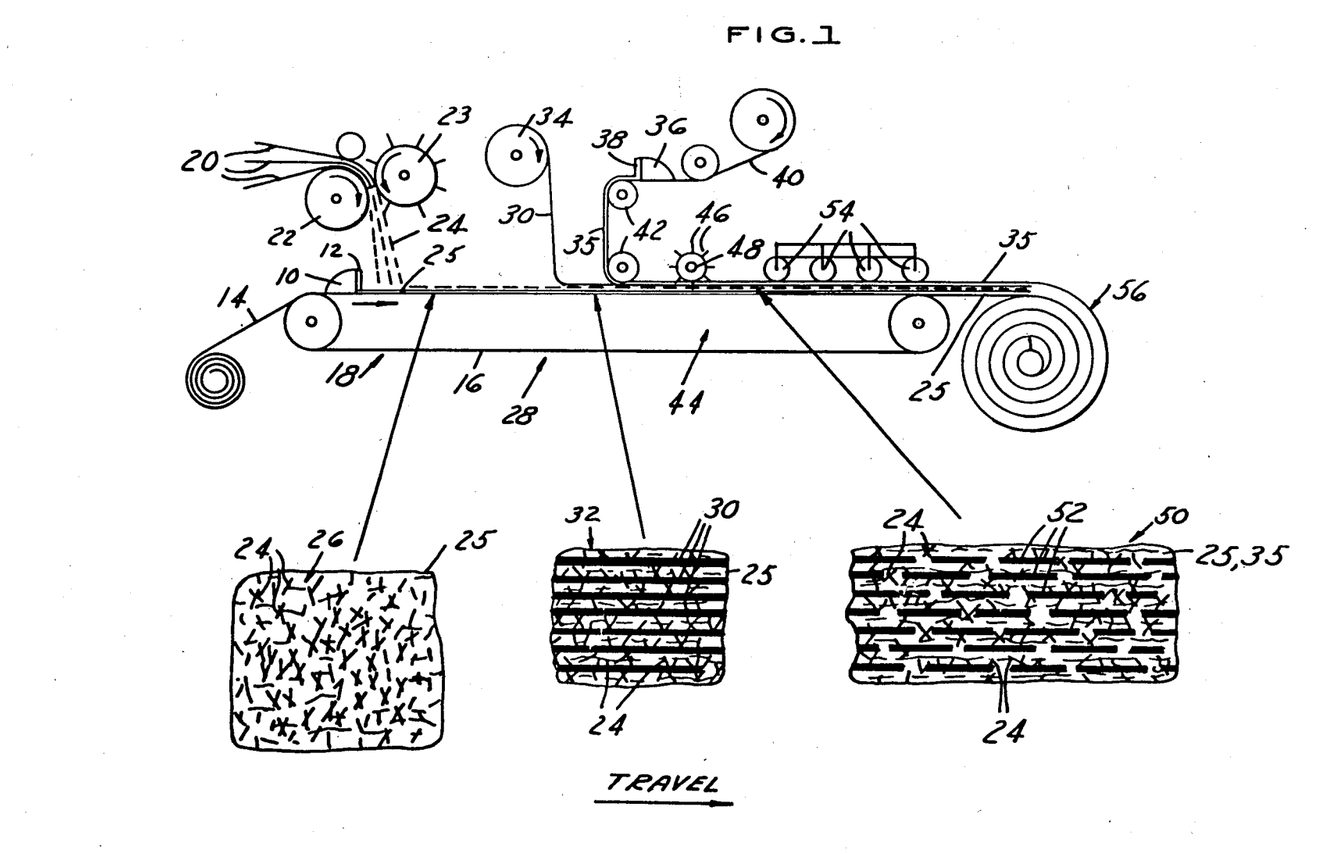
FIG. 1 is a schematic illustration of a process for providing one type of raw fiber-reinforced plastic resin sheet molding compound utilized in carrying out various embodiments of the present invention.

By way of background, a process line for providing one type of raw fiber-reinforced plastic resin sheet molding compound or stock utilized in carrying out the invention is illustrated in FIG. 1. A thermosetting resin paste 10 is metered as by a doctor blade or dam 12 onto a continuous sheet 14 of polyethylene film as the latter is drawn onto an endless belt conveyor 16. Paste 10 may include an unsaturated polyester, vinyl ester or epoxy resin, a thickener such as a Group II oxide or hydroxide, catalysts such as organic peroxides or hardeners, inert fillers such as $CaCO_3$ or clay, and a mold release agent such as zinc stearate. At a first stage 18, continuous fiber filaments or strands 20 are pulled over a roller 22 and chopped by a multiple knife roll arbor 23 to form fibers 24 which fall by gravity onto the paste layer 25 in a substantially random pattern essentially in the plane of the resin layer surface. The random fiber orientation accomplished at process stage 18 is illustrated in plan view schematically at 26. Preferably, the strands 20 are drawn from the inside of a fiber ball or roll (not shown) to promote random twisting of the fibers 24 in the resin layer. Reinforcing fibers 24 may be glass, aramid, carbon or graphite. Glass fibers, specifically E and S type glass fibers, are preferred.

At a second process stage 28, continuous fiber filaments 30 are laid upon resin layer 25 in a parallel equally spaced unidirectional pattern over the random chopped fibers 24 in a direction parallel to the direction of travel of conveyor 18. The fiber pattern at stage 28 is illustrated in plan view at 32. To prevent twisting of continuous fibers 30 in the sheet molding compound, the fiber strands are drawn from the outside of the roll 34. A second layer 35 of paste 36 identical to paste 10 is metered by a doctor blade dam 38 onto a second polyethylene film 40 and directed by rollers 42 onto the traveling film layer 25 to form a sandwich in which the continuous fiber strands 30 and the chopped fibers 27 are disposed essentially in the middle between layers 25,35 of plastic resin sheet material. At a third process stage 44, radially protruding blades 46 carried by an arbor 48 pierce upper film layer 35 and cut the continuous strands 30 to form the discontinuous parallel and substantially unidirectional fiber pattern illustrated in plan at 50. The blades 46 are disposed around the surface of arbor 48 so as to pierce the individual strands 30 at selected intervals, and thereby form a staggered array of discontinuous parallel and substantially unidirectional fiber strands 52 of a desired preselected length. The sandwiched sheet is then compacted as by rollers 54 and rolled into a roll 56 of continuous sandwich sheet material molding stock. The resin stock should be allowed to thicken by maturation to a molding viscosity in the range of 5,000 to 60,000 Pa-sec. It will be appreciated that the directional fibers are illustrated at 30,52 in FIG. 1 as being thicker than the random fibers 24 for purposes of contrast only, the fibers normally being of identical thickness and of the same type in actual practice.

As an alternative and presently preferred process mode, the step of piercing film layer 35 and cutting strands 30 can be performed after formation of the roll 56 of continuous sandwich sheet material. In this case, arbor 48 is not present in the process apparatus as shown in FIG. 1, but rather is disposed in a separate machine (not shown). The molding stock is fed beneath the arbor to pierce film 40 and cut strands 30 after the molding stock has been allowed to thicken or maturate, i.e., after sufficient time has elapsed for the polyester resin and Group II oxide or hydroxide to enter into a hydroxyl-carboxyl ionic reaction and for the reaction to progress until the paste layer 35 reaches the aforementioned viscosity of 5,000 to 60,000 Pa-sec. Piercing and cutting of strands 30 with the sandwich sheet material molding stock in this higher viscosity condition insures a minimum of resin squeeze-out or displacement through film 40.

It will be evident that the process illustrated schematically in FIG. 1 is adaptable for making sheet molding stock with only random fiber orientation or with only continuous fiber orientation, for example, rather than the multi-laminar directional-random orientation illustrated at 50. For example, process stages 28 and 44 may be deactivated such that the rolled sheet stock will contain only random chopped fibers 24 in the configuration illustrated at 26. Similarly, process stages 18 and 44 may be deactivated such that the ultimate rolled stock will include only continuous parallel strands 30 in the configuration illustrated at 32. It has been found to be advantageous in some instances to cover compacting rollers 54 with an endless belt or the like to help prevent reorientation or twisting of the fiber strands by serrations on the roller surfaces. For the fabrication of wheels, the random fiber configuration illustrated at 26 and the random-directional configuration illustrated at 50 possess particular advantages. The random-continuous fiber configuration illustrated at 32 also has been utilized in wheel fabrication in accordance with the present invention, although it is not presently preferred.

For a discussion of manufacture of sheet molding compound of the type hereinafter described, reference may be had to U.S. Pat. No. 4,167,130; "SMC and RIM: Calling up Reinforcements", *Automotive Engineering*, Vol. 86, No. 3, March 1978, pages 27–33; "Structural SMC: Material, Process and Performance Review", Owens-Corning Fiberglass Corp., Pub. 5-TM-8364, 1978. Glass fiber reinforcements, including E-glass and S-glass herein preferred, are discussed in "Evaluating Glass-Fiber Reinforcements", *Plastics Compounding*, July/August 1978, pages 14–25. The thickening or maturation process is discussed more fully in Deis et al, "Magnesium Oxide and Hydroxide for SMC", *Modern Plastics*, November 1974, pages 94–98; and Lawonn et al, "Fast Maturing of Unsaturated Polyester Resin Prepregs", *German Plastics*, translated from *Kunstatoffe*, Vol. 65, October 1975, pages 678–680.

Figure 2:
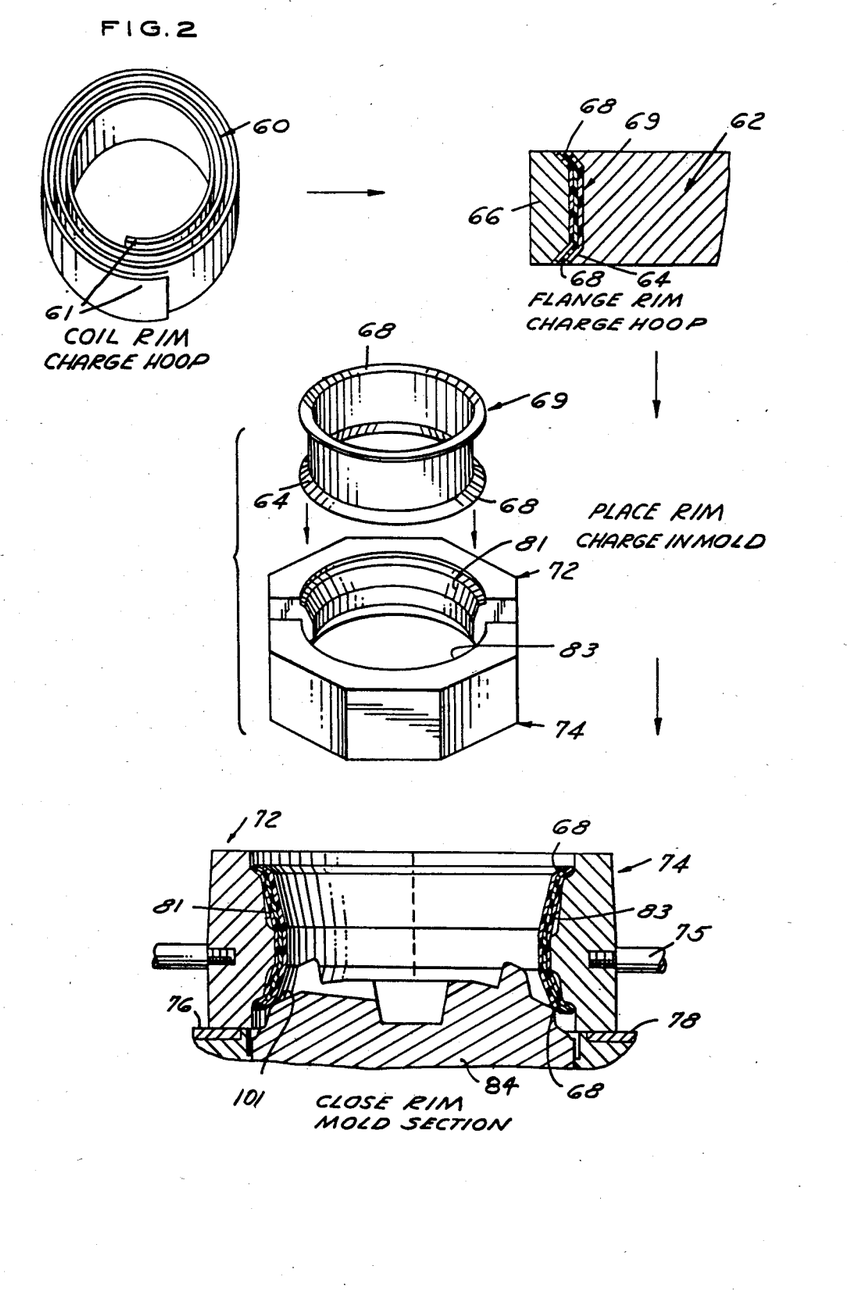
FIGS. 2 to 4 collectively illustrate presently preferred method steps for providing a fiber-reinforced composite wheel in accordance with the invention.
Figure 3:
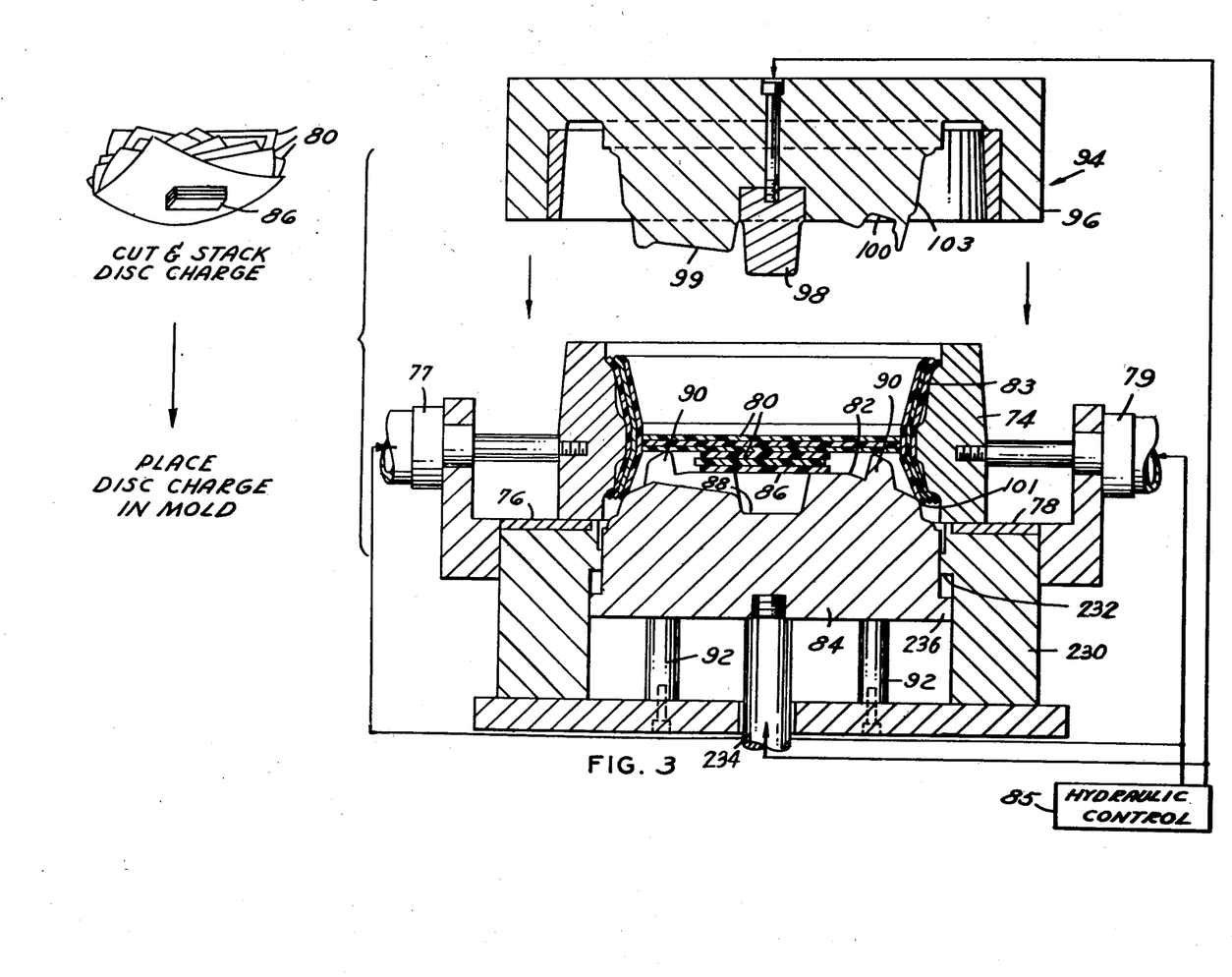
Figure 4:
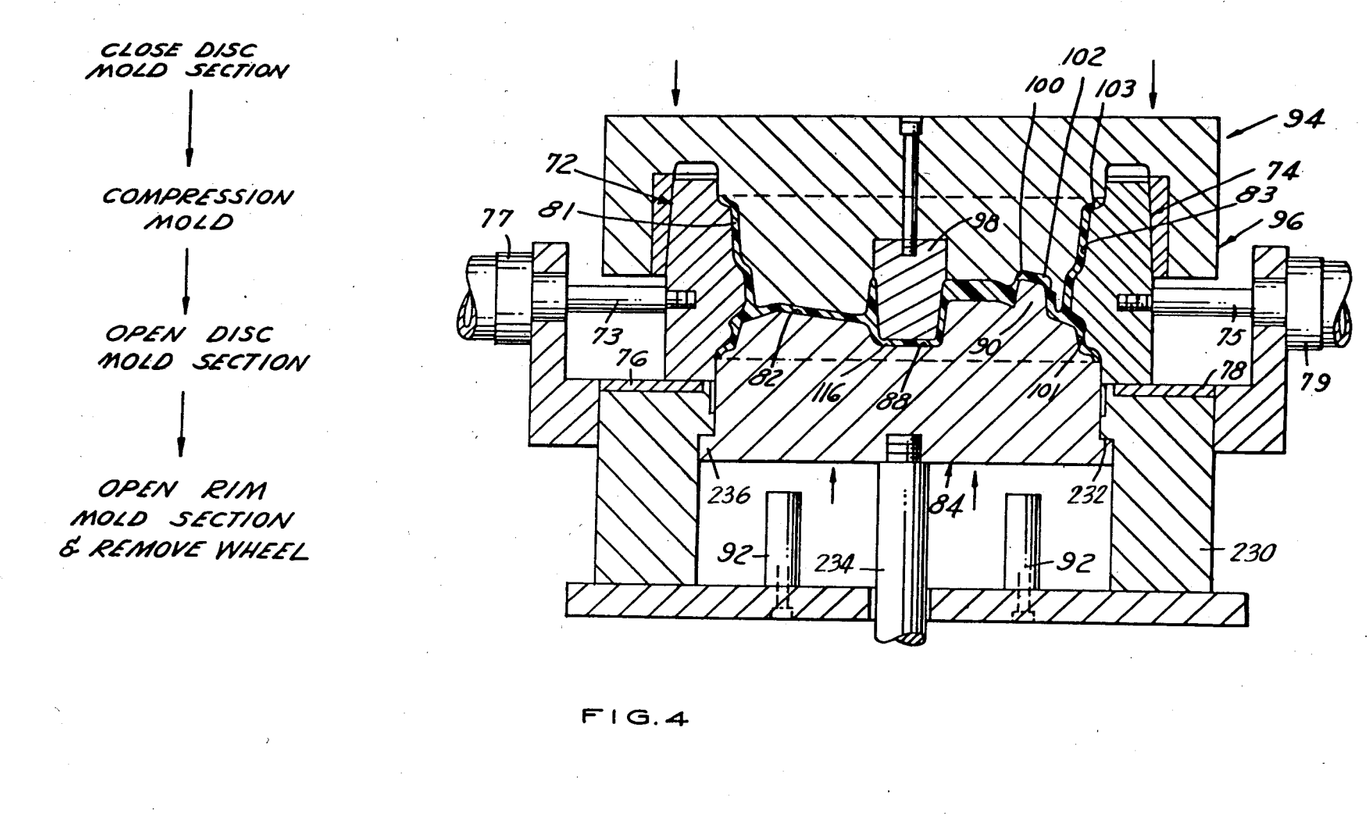
Figure 18:
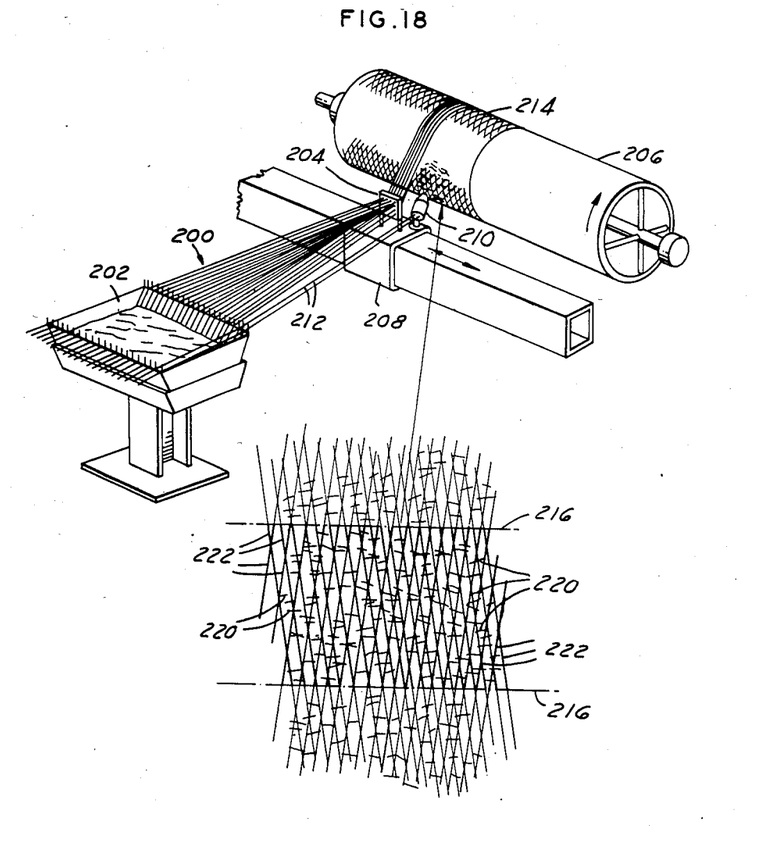
FIG. 18 is a schematic illustration similar to that of FIG. 1 illustrating another process for providing sheet molding compound for use in carrying out various embodiments of the invention.

A process for molding fiber-reinforced composite wheels in accordance with the invention is illustrated in FIGS. 2–4. Referring first to FIG. 2, a continuous strip of fiber-reinforced plastic resin molding stock is first coiled to form a rim mold charge hoop 60 of multiple spiral plies or layers. The molding sheet stock may be cut from roll 56 (FIG. 1) and coiled (with polyethylene films 14,20 removed). Alternatively, the sheet stock may be cut from the roll 206 in FIG. 18 manufactured in a manner to be described in connection therewith.

The particular rim charge embodiment illustrated at 60 in FIG. 2 comprises three spiral plies coiled from a continuous length of strip stock and having lapped ends 61. In actual practice it has been found that sheet molding compound is not always presently commercially available in lengths sufficient to form hoop 60 from a continuous length of strip stock. In such instances it is necessary to "dovetail" the ends of shorter sheet lengths. It is anticipated that sheet strips of desired length will be made available for high volume production of wheels. It should also be noted that some embodiments to be discussed include different types of sheet molding compound, i.e. having differing fiber orientations, necessitating multiple lengths of strip stock. In every case, the number of spiral plies required depends upon the number of different types of sheet molding compound needed and the thickness of each sheet. Hoop 60 in FIG. 2 is for illustrative purposes only.

Hoop 60 may be formed by coiling about a rotatable mandrel (not shown) to a diameter approximating the ultimate desired median diameter of the wheel rim. Where the wheel rim is of a type which includes bead retaining flanges at one or both of the opposite rim edges, it has been found to be advantageous to flare outwardly the axial hoop edges prior to placing the hoop in a wheel mold. Accordingly, the hoop 60 is preferably placed on a rotatable die 62 having an outer surface 64 which cooperates with a rotatable roll follower 66 to give a slight outward flare to the hoop edges 68 to thus provide a first preform 69. The flared rim charge hoop preform 69 is then placed between two radially outwardly opened rim mold half sections 72 and 74 such that the lower flared end 68 rests upon the upper face of a lower disc mold section 84. Mold sections 72,74 are connected by push rods 73,75 to hydraulic cylinders 77,79 (FIG. 3) and are slidable inwardly on guideways 76,78. Cylinders 77,79 are operatively coupled to a suitable hydraulic control 85. The radially inner or forming surfaces 81 and 83 of mold sections 72 and 74 respectively are preferably contoured to form a rim well, bead retaining flanges and suitable tire bead seats on the outer rim surface. After flared charge hoop preform 69 is placed on disc mold section 84 between rim mold sections 72,74, the rim mold sections are closed and the preform 69 is captured therein in slight radial compression. In a continuous production process, mold sections 72,74 are maintained at an elevated temperatured in the range of about 270° F. (132° C.) to about 320° F. (160° C.).

Referring next to FIG. 3, a plurality of flat sheet sections 80 of fiber-reinforced (plastic) sheet molding compound, suitably cut from a roll of stock similar to roll stock 56 after stripping films 14 and 40 therefrom, are then stacked one upon another to form a disc mold charge. The roll of stock preferred for use in making these disc charge sections 80 is made in the manner described in connection with FIG. 1, except that continuous fibers 30 are omitted, as is the step of piercing and cutting thereof by arbor 48. This disc charge stack is then placed in the mold on the forming surface 82 of a lower disc mold section 84 coaxially within the rim mold charge 69. As shown in FIG. 3, disc charge stack 80 is supported in the mold by the horns 90 extending upwardly therefrom to cooperate with corresponding cavities 100 in the upper disc mold section 94 to form pockets for the disc hand holes, as will be described hereinafter. Preferably, the disc charge sections 80 are each substantially square and are stacked with section corners circumferentially staggered in a rosette pattern so as to obtain maximum coverage of the disc mold face 82. This particular configuration has been found to result in minimized material flow and resulting knit lines in the final disc. Mold parts 84, 94 and 230, (in addition mold parts 72,74) are continuously maintained at an elevated temperature in the aforementioned range of about 270° F. (132° C.) to about 320° F. (160° C.) during and between the molding sequence or cycle of operation.

Where the eventual wheel is of a type which is to include a hub extending axially from the main portion of the disc, a number of smaller square hub charge sheet sections 86 are disposed between the disc stack 80 and mold face 82 over the cavity 88 formed in the mold face. Cavity 88 cooperates with a horn 98 mounted on the opposing surface 99 of upper disc mold section 94 to form a hub pocket in the wheel disc. Sections 86 help displace air that may otherwise become entrapped in cavity 88 upon closure of the disc mold sections. The outwardly directed radial surface 101 and 103 of disc mold sections 84 and 94 respectively cooperate with surfaces 81,83 to define in a mold cavity contour the rim well, flanges and bead seat rim portions of generally uniform thickness. It should be noted that the number of plies in disc charges 80,86 and rim charge 69 in FIG. 3 depends upon the desired wheel thickness and upon sheet stock density. As indicated above, it is desirable to lay disc charge sections 80 in a pattern which substantially covers the mold face and thereby approximates the eventual disc geometry to reduce material flow during the ensuing compression molding operation. Given any particular density of sheet molding compound and the desired wheel size, the number of plies, etc. may readily be determined be persons skilled in the art to fill the mold volume with minimal overflow. It is also envisioned that disc mold charges other than the presently preferred rosette stack-up may be used to form discs of other configurations, such as a square charge to form a four-spoke disc.

As a next step in the compression molding operation bridging FIGS. 3 and 4, lower disc mold section 84 is displaced upwardly from its rest position on lower stops 92, and upper mold disc section 94 is simtultaneously displaced downwardly by hydraulic control 85 until the disc mold sections are in axially opposed initial forming positions within the closed rim mold 72, 74, which are very close to the fully closed and final compression molding positions illustrated in FIG. 4. Preferably, motion of mold sections 84,94 is controlled such that the mold sections move together and reach their final positions (FIG. 4) substantially simultaneously. Since upper mold section 94 must be initially positioned away from mold sections 72,74 and 84 to permit placement of the mold charges, this necessitates a greater controlled rate of travel for the upper mold section. Mold section 84 is guided by a surrounding sleeve 230 having an axial stop shoulder 232 thereon to cooperate with a lip 236 on mold section 84 to limit upward motion of the disc section, and is connected by a rod 234 to a suitable hydraulic cylinder (not shown). A sleeve skirt 96 axially projecting from the radially outer edge of upper mold 94 captures rim mold sections 72,74 as mold 94 is lowered thereby to clamp the rim mold sections and simultaneously guide disc mold section 94 into position.

Horn 98 on upper mold surface 99 initially forms the hub charge 86 into opposing cavity 88 in lower mold section 84. At the same time, horns 90 initially form the disc charge 80 into corresponding recesses 100 in the upper mold surface so as to mold initially a circular array of pockets 102 (FIGS. 4–7) offset from the wheel disc 104 but integrally connected thereto by the narrow circumferentially continuous bridging section 106 around esch pocket. The closed mold is then subjected to high pressure on the order of 1500 psi (10.3 megapascals) at an elevated temperature of 132° C. to 160° C. for on the order of 5 minutes to form by compression molding an integral rim and disc structure of essentially homogeneous resin reinforced by the dispersed fibers. The mold sections are then opened in an order reverse to that previously described and the mold wheel 116 (FIGS. 5–7) is removed for finishing.

It may be noted at this time that a particular advantage of the molding process thus far described is thought to lie in the provision of a movable lower disc mold section, particularly in combination with the step of flaring the ends of the rim charge to form the open flanges 68 as previously described. As will be appreciated from FIGS. 2–4, the slightly retracted position of lower disc mold section 84 at the time when flanged rim charge 69 is placed in the mold permits the lower flanged portion of the rim charge which will ultimately become the outboard rim flange 122 (FIG. 6) to be located closely adjacent the flange-forming surfaces of rim mold sections 72,74 when the latter are closed. This, in turn, means that the mold material will not be "pushed" into the flange area as the disc mold sections are closed. This feature results in a more uniform distribution of reinforcing fibers in the flange than would be the case if mold section 84 were fixed. This is particularly important when directional fibers transverse to the wheel rim are utilized, as in FIGS. 13–17 to be discussed. In molds for production wheels, rim molds possessing more than two mold sections may be utilized without departing from the invention.

Figures 5, 6, 7, 19:
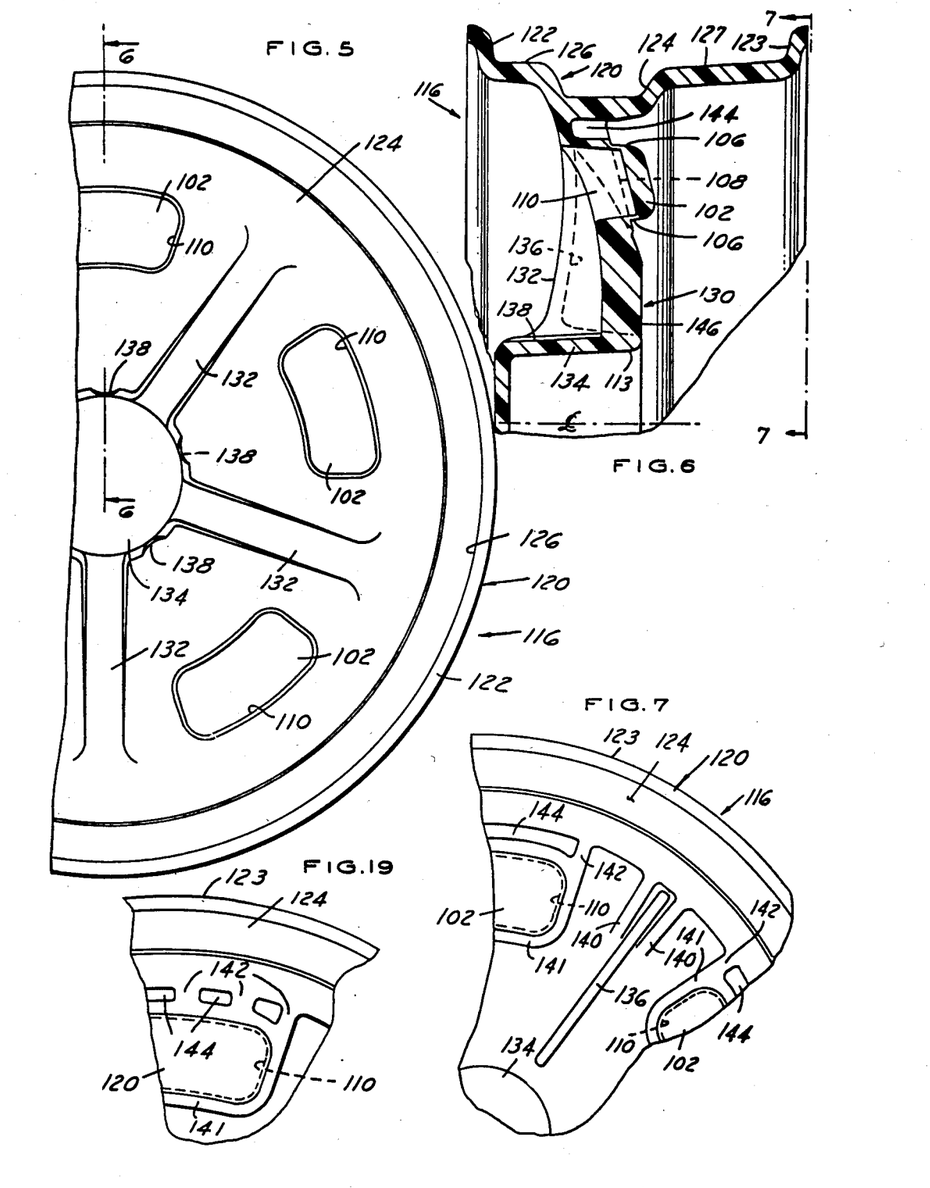
FIG. 5 is a fragmentary front elevational view of one wheel embodiment as molded in accordance with the steps of FIGS. 2-4.
FIGS. 6 and 7 are fragmentary side section and rear views of the wheel in FIG. 5 taken along the respective section lines 6—6 in FIG. 5 and 7—7 in FIG. 6.
FIG. 19 is a fragmentary sectional view similar to a portion of FIG. 7 and illustrating a modification to the wheel of FIGS. 5-10.

The wheel 116 as molded includes a rim section 120 with integral bead retaining flanges 122,123 and a center drop well 124 (FIG. 6) coupled to flanges 122 by the bead seats 126,127. As best seen in FIG. 6, drop well 124 is offset or asymmetric with respect to the rim centerline, which is to say that drop well 124 is located nearer outer flange 122 than inner flange 123 ("outer" and "inner" being taken with reference to the preferred orientation of the finished wheel mounted on a vehicle). The disc portion of wheel 116, which is generally indicated at 130, is coupled to rim portion 120 at the lower outer edge of drop well 124. The outboard face of disc 130, best seen in FIGS. 5 and 6, includes a symmetrical array of five circumferentially spaced radial ribs 132 alternating with pockets 102 previously described. Each rib 132 extends wideningly from adjacent drop well 124 to flare into a central outwardly cupped hub shell 134. Ribs 132 not only strengthen the wheel, but also lend an ornamental spoked configuration thereto. The outer surface of shell 134 includes an axially extending channel 138 in radial alignment with the center of each pocket 102.

Ribs 132 are hollow, which is to say that a pocket 136 extends into each rib 132 at the inboard face of the wheel disc, as best seen in FIG. 7. Each rib pocket 136 is straddled by a pair of strenghtening ribs 140 (FIG. 7) which flare into the base of drop well 124. Similarly, each hand hole 110 is surrounded by a continuous strengthening ledge or bead 141 best seen in FIG. 7. The radially outer portion of each ledge 141 is separated from rim well 124 by the pockets 144 (FIGS. 6 and 7). Between ribs 132 and openings 110, disc portion 130 tapers narrowingly from a thickened region (FIG. 6) adjacent shell 134.

During the finishing operation, flash is removed from the edges of bead retaining flanges 122,123. The bottom and side edges of each pocket 102 are removed flush with ledge 141 along the phantom line 108 in FIG. 6 so as to form a circular array of openings or hand holes 110 (FIGS. 8-10) in the wheel disc to cooperate with ribs 132 in lending a spoked configuration to the wheel as a whole. A hub center hole 114 is bored in the base of shell 134. A circular array of mounting holes 112 is drilled or otherwise formed in the thicker portion 146 of wheel disc 130 coaxially with wheel pilot surface 113 (FIGS. 6 and 9), one bolt hole 112 in outwardly spaced radial alignment with each channel 138 in the hub shell outer surface. An opening 150 is drilled in rim 120 for an inflation valve. It has been found that molding of an imperforate disc as previously described, although requiring finishing operations on the molded wheel for removal of the pockets 102 and drilling of the bolt holes 112, etc., reduces knit line formation in the molded product and thus enhances strength and reliability of the finished wheel 114 during operation. The wheel as molded and as finished is illustrated at 116 (FIGS. 5-7) and 117 (FIGS. 8-10) respectively.

In construction of wheels in accordance with the invention to the extent thus far described and utilizing sheet molding compound per FIG. 1, glass fiber-to-resin weight ratios from about 45% up to about 75% have been tested, with a fiber/resin weight ratio of 50/50 being preferred. Fiber/resin ratios below 30% are considered to contain too little fiber reinforcement for manufacture of automobile road wheels, while ratios above 75% exceed the "wetting limit" of the glass fiber and thereby possess both reduced moldability and poor resin-glass adhesion. The paste is of about 50% resin and about 50% filler with small amounts of catalysts, etc. as previously described. In the construction of wheels in accordance with one embodiment of the invention, the random fiber pattern 25 (FIG. 1) and the directional/random pattern 50 are particularly advantageous in the disc charge and in the rim charge respectively. Preferably, although not necessary, the rim charge is coiled such that the directional fibers lie radially inward of the random fiber layer in each charge ply. Random fibers 24 may be from 1.25 cm to 10 cm in length, all fibers having the same length, preferably 5 cm. Directional fibers 52 may be between 5 cm and 30 cm in length, with a 20 cm length being preferred. The usable range of fiber lengths, as fiber/weight ratios, is determined by strength and moldability. Using a 50% glass fiber weight ratio as is preferred, directional/random fiber weight ratios in the range of 5/45 to 45/5 are envisioned, with a range of 20/30 to 30/20 being preferred.

In one wheel constructed in accordance with the invention, a disc charge consisted of multiple plies of 50% random fibers by weight, with the random fibers 24 being about 2.5 cm in length and being oriented essentially in planes perpendicular to the mold axis. The rim charge consisted of a hoop of directional/random sheet molding compound, again 50% fibers by weight. The rim charge hoop was coiled with the directional fibers 52 disposed radially inwardly of the random fibers 24 in each ply and oriented in the circumferential direction. The random fibers 24 were thus disposed essentially in a spiral pattern of revolution about the mold axis. Directional fibers 52 were 20 cm in length and random fibers 24 were 5 cm in length at a directional/random weight ratio of 30/20.

In the following material specification for both the disc and rim charge of the aforementioned example of a wheel in accordance with the invention (see construction B3 in Table III for test results), "SMC" is a trade designation for sheet molding compound. The particular compounds utilized were manufactured by Owens-Corning Fiberglas. D refers to directional fibers of the type illustrated at 52 in FIG. 1, and R refers to random fibers 24. Thus, SMC-R50 means sheet molding compound containing 50% random fibers by weight. (See the above-referenced *Automotive Engineering* publication.)

TABLE I

| SMC - Sheet Molding Compound For Disc Charge | |
|---|---|
| Type | SMC-R50 |
| Product Width | 46 cm (69 cm, 92 cm or 115 cm optional) |
| Product Weight | 4.6 kg/m$^2$ |
| Product Density | 1.9 g/cm$^3$ |
| Package | 32 kg minimum - 180 kg maximum/roll |
| Glass % | 50% ± 1 |
| Glass Type | OCF 433/AB/47 (47 is yield in m/kg) |
| Glass Source | Owens/Corning Fiberglass |

TABLE I-continued

| Glass Length | 2.54 cm | | |
|---|---|---|---|
| Paste Formulation: | | | |
| | | Parts by Weight | Source |
| Resin | DERAKANE 790 | 100 | Dow Chemical Co. |
| Catalyst | t-butyl perbenzoate | 1% BOR* | U.S. Peroxygen Co. |
| Filler | Camel Wite ($CaCO_3$) | 100 | H. T. Campbell & Sons |
| Mold release | Synpron ABG (Zinc Stearate) | 3% BOR* | Synthetic Products |
| Thickener | 40% MAGLITE D/60% DERAKANE 470-45 + | 4.7% BOR* | MERCK Co/Dow Chemical |
| Paste Viscosity: | | | |
| | HBT Brookfield Viscometer, T-F spindle @ 29° C. | | |
| | 5 days | 50,000 Pa-sec | |

+ Magnesium oxide slurry
*BOR Based on resin

Material Specification

| Resin | |
|---|---|
| Trade name | DERAKANE 790 |
| Source | Dow Chemical Co. |
| Chemical Name | Vinyl ester |
| Non-volatiles | 45% |
| Monomer | Styrene |
| Acid Number | 25 |
| Viscosity | 1.1 Pa-sec. |
| Density (gm/ml @ 25° C.) | 1.03 |
| SPI Gel time @ 82° C. | 30 minutes |
| Time to peak | 32 minutes |
| Peak exotherm | 188° C. |

SMC - Sheet Molding Compound For Rim Charge

| | |
|---|---|
| Type | SMC-D/R |
| Product Width | 38 cm (76 cm or 115 cm optional) |
| Product Weight | 2.88–3.16 kg/m² |
| Package | 32 kg - 135 kg/roll |
| Glass Length | D - 20 cm; R - 5 cm |
| Glass % | D - 30%; R - 20% |
| Glass Type | OCF 433/AB/47 (47 yield in m/kg) |
| Source | Owens/Corning Fiberglass |
| Color | CM-1003 Black (variable) Plasticolors, Inc Added to Paste Formulation |

Paste formulation and paste viscosity (same as for SMC-R50)

A number of different wheel constructions have been constructed and tested to the following 1978 original equipment fatigue test specifications for intermediate size car body styled wheels:

TABLE II

| Dynamic Cornering Fatigue | |
|---|---|
| Disc Fatigue | $B_{10}$ - 30,000 cycles |
| | No failure below 20,000 cycles. |
| Bending Moment | 2263 N · m |
| | SAE J 328a requires 18,000 cycles. |
| Dynamic Radial Fatigue | |
| Rim Fatigue | $B_{10}$ - 1,000,000 cycles |
| | No failure below 800,000 cycles. |
| Radial Load | 12,910 N |
| Test Tire Pressure | 448 kPa |
| | SAE J 328a requires 400,000 cycles. |

Figures 8, 9, 10:
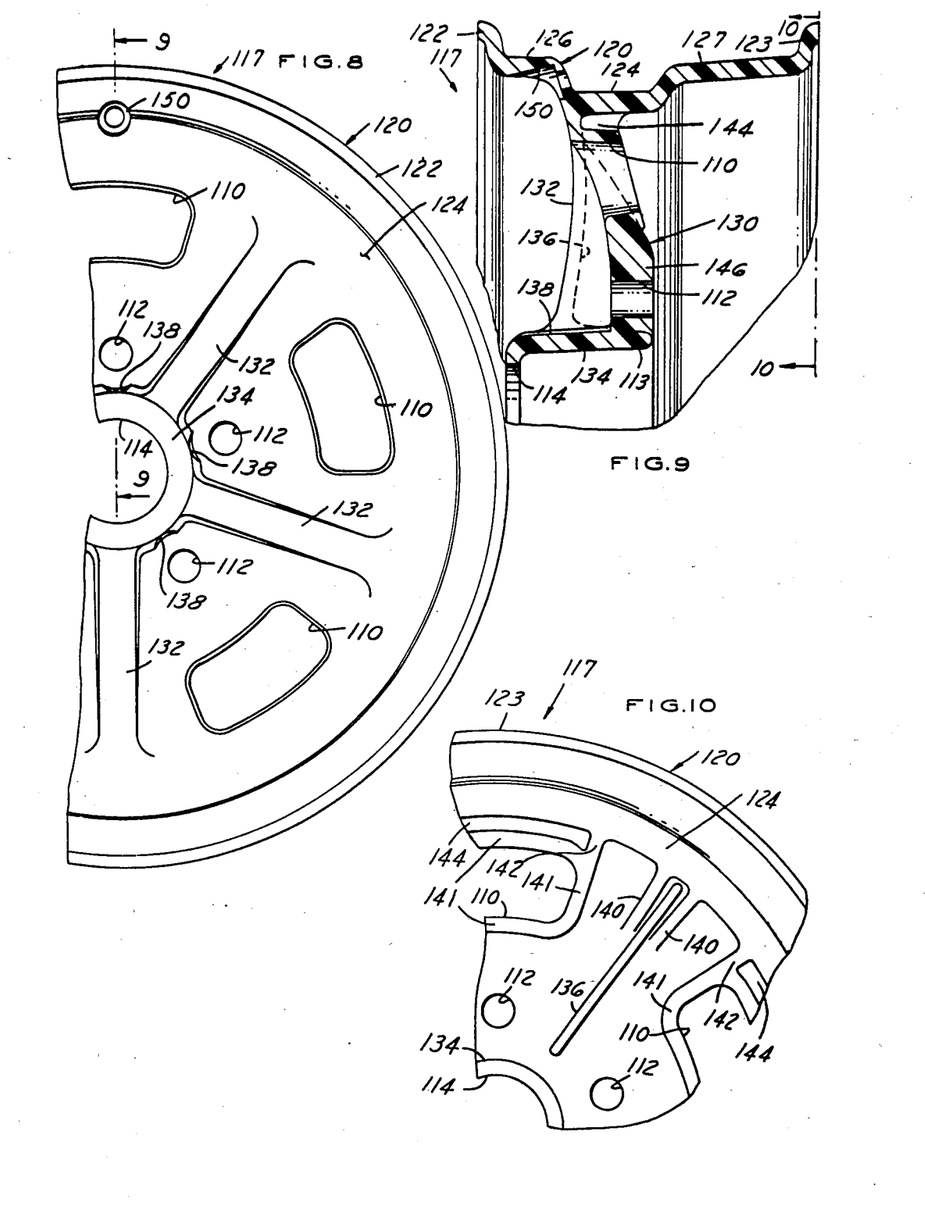
FIG. 8 is a fragmentary front elevational view of a finished wheel in accordance with one embodiment of the invention.
FIGS. 9 and 10 are fragmentary side section and rear views of the wheel in FIG. 8 taken along the respective lines 9—9 in FIG. 8 and 10—10 in FIG. 9.

All of the tested wheels (with the exception of one construction D wheel) embodied SMC-R50 material in the disc charge pattern as previously described, and all of the wheels as finished were identical to that shown to scale at 117 in FIGS. 8–10. The various rim (belt) constructions are illustrated schematically in FIGS. 11–17 and the following table compares belt construction to test results:

TABLE III

| BELT CONSTRUCTION | DWG. FIG. | GLASS LENGTH (cm) D/R | DISC FATIGUE (cycles) @ 2263 N · m | RIM FATIGUE (cycles) @ 12,910 N |
|---|---|---|---|---|
| None* | — | None/2.5 | 428,000** | 169,000 |
| A (R-50) | 11 | None/2.5 | 1,090,000 | 5,382,390 |
| B1 (D-30/R-20) | 12 | 20/2.5 | 376,592** | 289,830 |
| B2 (D-20/R-30) | 12 | 20/5 | — | 159,390 |
| B3 (D-30/R-20) | 12 | 20/5 | 1,100,000 | 3,599,000 |
| B4 (D-10/R-40) | 12 | 20/2.5 | — | 288,400 |
| C (D-30/R-20) | 13 | 20/5 | — | up to 8.7 M**** |
| D (R-65, X/DR 63 to 65) | 16 | (None/2.5) (DR = 2.5) | 865,000*** | up to 21 M |

TABLE III-continued

| BELT CONSTRUCTION | DWG. FIG. | GLASS LENGTH (cm) D/R | DISC FATIGUE (cycles) @ 2263 N · m | RIM FATIGUE (cycles) @ 12,910 N |
|---|---|---|---|---|
| E (D-30/R-20, R-50) | 14 | 20/2.5 None/2.5 | — | avg. 2 M to 4 M |
| F (R-65, X/DR 63 to 65) | 17 | None/2.5 (DR = 2.5) | — | from 4.6 M |
| G (R-50, D-30/R-20) | 15 | None/2.5 20/2.5 | — | up to 6.5 M |

*Disc and rim compression molded from one mold charge consisting of a rosette stack-up of SMC-R50 arranged in a manner to sections of FIG. 3.
**Wheel construction an early version of FIGS. 5–10 with radial ribs 142 spanning cavities 144 as shown in FIG. 19.
***Only wheel tested had disc constructed of SMC-R65.
****M = mega or million cycles.

Figure 11:
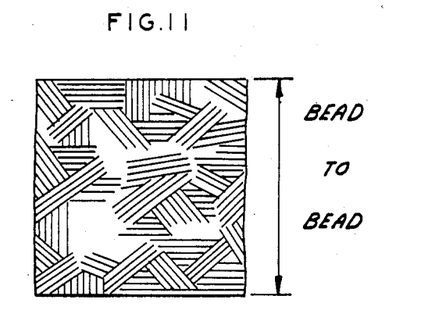
FIGS. 11-17 are schematic drawings illustrating various constructions of the rim charge for molding fiber-reinforced composite wheels in accordance with the invention.

FIGS. 11–17 schematically illustrate lay-ups of sheet molding compounds in various belt constructions in accordance with the invention. In each of FIGS. 11–17, the stock is viewed from the tire-side or radially outer side of the rim charge. The bead-to-bead direction is vertical as shown in FIG. 11, the horizontal dimension being broken to facilitate illustration. FIG. 11 illustrates construction A in Table III wherein the belt is comprised of three spiral plies of sheet molding compound with 50% by weight random glass rovings (i.e. SMC-R50) manufactured in accordance with the previous discussion relative to FIG. 1. Although the test results for construction A are good, it was found that this selection of belt material gave less than desired uniformity wheel-to-wheel.

Figure 12:
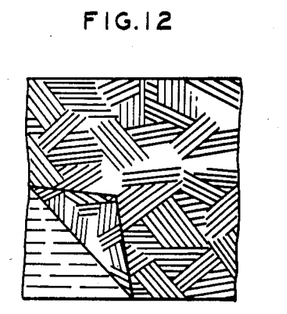

FIG. 12 illustrates the construction previously described in detail and for which test results for different glass compositions and lengths are shown in exemplary constructions B1, B2, B3 and B4 in Table III. In the various types of sheet molding compound constructed in accordance with FIG. 1, the random and directional fibers are deposited at separate stages as previously described in essentially separate layers. FIG. 12 illustrates the preferred orientation wherein the random fibers in each ply are disposed radially outwardly of the directional fibers in the same ply with reference to the rim charge axis. Three to six plies are required depending upon material thickness and density. The directional fibers are oriented circumferentially of the wheel rim. As will be appreciated from Table III, construction B3 gave good test results.

Figure 13:
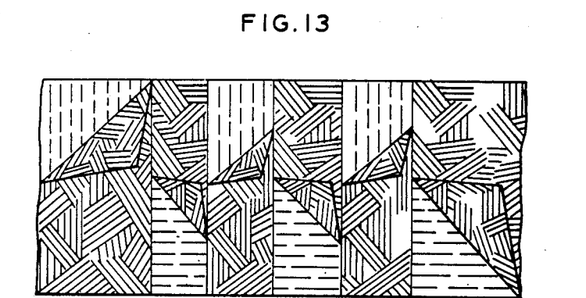

FIG. 13 illustrates belt construction C consisting of a continuous spirally wound sheet with circumferential directional fibers as previously described and with a second spiral pattern of individual charge pieces located between the continuous spiral plies and having axially oriented directional fibers, i.e. transversely of the final wheel rim. This charge was constructed by cutting the individual pieces from a first continuous strip of sheet molding compound and then laying the pieces side-to-side on a second strip before the latter was spirally wound. The directional fibers in the continuous spiral ply were oriented lengthwise of the strip and therefore essentially circumferentially of the charge axis. The directional fibers in the individual pieces or segmented charge ply, however, were oriented axially of the charge—i.e. at an angle of 90° with respect to those in the continuous ply—so that the directional fibers in the composite lay-up formed an essentially grid pattern directed circumferentially and axially of the rim and wheel. Wheels molded from a rim charge so constructed and tested under load conditions ran for up to 8.7M (million) cycles prior to rim failure (construction C in Table III). It should be noted at this point that all wheels actually tested and exemplified in constructions A and B2-G in Table III were that previously discussed in connection with FIGS. 5–10 and included (with the exception of one construction D wheel) discs molded from SMR-R50 rosette stack-ups (FIG. 3). It was therefore believed that disc performance would be consistent throughout with the performance of constructions A and B3 and was not tested (with the exception of one construction D wheel).

It is also contemplated that continuous directional fibers may be used in the rim charge. However, directional discontinuous fibers are preferred over continuous fibers circumferentially of the rim charge for reasons of superior moldability in the disclosed process, i.e. to allow separation of the reinforcing fibers circumferentially of the hoop blank 60 during the molding operation. Such separation must occur since in the preferred process the rim charge is made smaller than the ultimate rim diameter and must be capable of circumferential stretching, with attendant increased fiber separation, as the hoop blank is expanded in mold 62–66 and in mold 74.

As another modification, it is contemplated that the sprial three-layer wrap for rim charge hoop 60 (FIG. 2) may be replaced by three separate concentric hoops with circumferentially staggered lap joints. Alternatively, the rim charge may comprise one coil of thick (sheet) molding compound (TMC) of the type described in "Best of SMC and BMC—And Then Some", *Plastics World*, July 1977. See also U.S. Pat. No. 3,932,980. Similarly, rosette disc charge pattern 80 (FIG. 3) may be replaced by one sheet section of TMC which is a trademark of U.S. Steel. Such a modification has the potential advantage when using TMC-R of providing random (R) fibers oriented in all directions, i.e. not just primarily in planes perpendicular to the wheel axis. Thus, although SMC is preferred for molding the wheel of the instant invention in the embodiments thus far described, TMC may be utilized and is contemplated in accordance with the invention in its broadest aspects.

Figure 14:
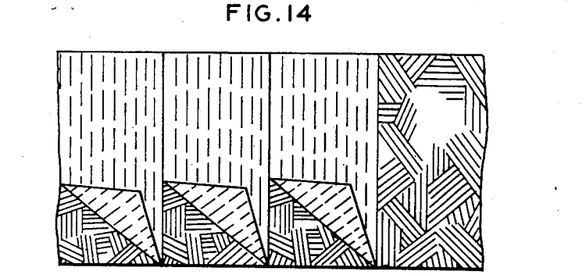
Figure 15:
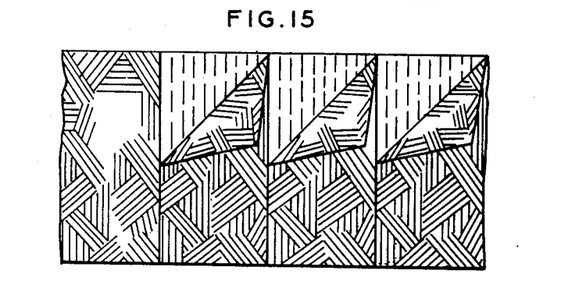

FIGS. 14 and 15 respectively illustrate complementary belt constructions E and G (Table III). In construction E (FIG. 14) three inner layers of SMC-D/R with directional fibers oriented transversely of the wheel rim are surrounded by a ply of SMC-R50. In construction G (FIG. 15) the SMC-R50 is the inner ply. In each belt construction E and G, three plies of D30/R20 compound weighing 2.0 kilograms (kg.) and one ply of R50 compound weighing 1.3 kg. gave a total weight of 3.3 kg. Fiber content was 50%, 31.8% random (R) and 18.2 directional (D). The preferred range for both random and directional fibers is 18% to 32%, with the total of both being about 50%, all by weight. Test results are shown in Table III.

Figure 16:
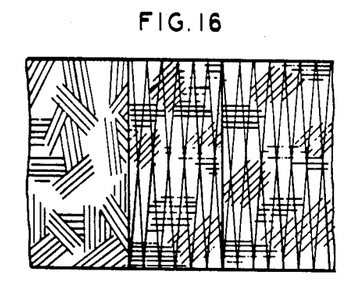

FIG. 16 illustrates a belt construction D comprising one ply of SMC-R65 and two plies of sheet molding compound marketed by PPG Industries, Inc. of Pittsburgh, PA under the trademark XMC. This sheet molding compound is constructed in accordance with the process schematically illustrated in FIG. 18 by drawing a plurality of continuous fibers 200 from corresponding individual creels (not shown) through a resin bath 202 and a number of eyelets 204 onto a rotating mandrel 206. Eyelets 204 are mounted on a carriage 208 which oscillates in a direction parallel to the axis of mandrel 206, such that the fibers 200 are deposited in multiple helical layers in either direction to form essentially a double-helical pattern.

A chopper/gun 210 is mounted on carriage 208 and receives one or more fiber threads 212. These fibers are chopped to preselected lengths and blown onto the wrap or lay-up 214 on mandrel 206. Because of the motion of carriage 208 and chopper/gun 210 with respect to the mandrel axis, the chopped fibers are deposited in a "random" pattern essentially or substantially in a direction parallel to the mandrel axis. These fibers are referenced herein as "directional-random" fibers, or DR in Table III. The rate of oscillation of carriage 208 with respect to the angular velocity of mandrel 206 may be varied to control the helix angle of fibers 200. Reference may be had to U.S. Pat. No. 4,167,429 for a general discussion of the process hereinabove described in connection with FIG. 18.

When wrap 214 is completed, it may be cut axially and removed from mandrel 206. For construction of wheel rim charges in accordance with the invention, the sheet is further cut in the direction of the mandrel axis as at 216 to preselected widths generally corresponding to rim width. The result is a plurality of lengths of strip stock, preferably eight inches wide, of which one is partially illustrated in FIG. 18. Each strip includes directional fibers 222 in essentially an X-pattern at acute angles transversely of the strip and with the directional-random 220 fibers oriented essentially lengthwise of the strip. Following is a material specification of XMC sheet molding compound utilized in constructing wheels in accordance with the invention and to be discussed:

TABLE IV

| Type Designation | XMC |
|---|---|
| Weight | 5.5 kg/m² (18 oz./sq. ft.) |
| Glass Content: | |
| Total: | |
| Range | 55% to 80% |
| Preferred | 60% to 65% |
| Directional-Random: | |
| Range | 15% to 20% of total |
| Preferred | 20% of total |
| Directional | Remainder |
| Glass length (directional-random): | |
| Range | 1.25 cm to 5.0 cm (0.5 in. to 2.0 in.) |
| Preferred | 2.5 cm (1.0 in.) |
| Glass type: | |
| Directional | PPG K15 E glass |
| Directional-Random | PPG K37 E glass |
| Helix angle: | |
| Range | 79° to 82° (with reference to the mandrel axis) |
| Preferred | 80 · 16° (with reference to the mandrel axis) |

TABLE IV-continued

| Paste Formulation (sources same as in Table I): | | |
|---|---|---|
| Resin | DERAKANE 790 | 80% |
| Filler | Calcium Carbonate | 20% |
| Mold Release | Zinc Stearate | 3% BOR |
| Catalyst | T-Butyl Perbenzoate | 1% BOR |
| Thickener | Magnesium Oxide | 2% BOR |

Formulation for SMC-R65 same as above except containing 65% random 2.5 cm (1 in.) fibers.

Above 80% total glass content, the sheet molding compound is thick and difficult to handle. Below 55% glass, the resulting wheel rims are weak. Below a helix angle of 79°, the fiber ends in the rim flanges are too spread to yield desired strength. Above 82°, the wheel rim exhibits diminished circumferential strength. The angle of 80.16° is one available in this range without modification in the existing wrap-winding machine at PPG, and is presently preferred for this reason. The degree of criticality of the helix angle within the range of 79° to 82° is unknown. The number of layers of directional fibers, i.e. the number of passes of carriage 208 (FIG. 18) across mandrel 206, must be sufficient to "fill" all diamond-shaped openings between the directional strands.

FIG. 16 illustrates a belt construction D comprising an inner layer of SMC-R65 and two outer layers of X-pattern/directional-random sheet material (X/DR in Table III). Total weight of each belt was 3.2 kg., consisting of 2.48 kg. XMC compound (total for two plies) and 0.72 kg. R65 compound. Total glass was on the order of 65% by weight, comprising 14.7% random (R), 10% directional-random (DR) and 40.3% directional or X-fibers.

As will be appreciated from Table III, belt construction D gave surprisingly excellent results, particularly when it is recalled that steel wheels are normally expected to run only 800,000 cycles without a rim fatigue failure. It is believed that the improved test results of construction D are due at least in part to the orientation of directional fibers transversely of the wheel rim, i.e. axially of the wheel. Due to the improved molding process previously described, these transverse directional fibers extend into the rim flange and thereby strengthen the flange-bead seat radius where fatigue failures often occur in steel wheels. Indeed, it was found that the most common mode of eventual failure of construction D wheels consisted of small cracks at the front rim well radius. Since this failure mode results in a slow air leak, it would be a preferred mode of failure during actual highway use.

Figure 17:
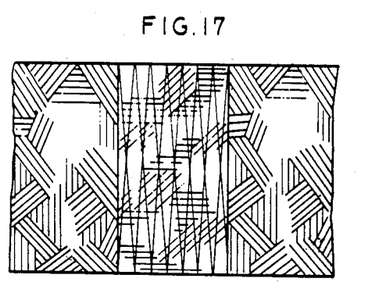

FIG. 17 illustrates a belt construction F comprising an X/DR ply sandwiched between plies of SMC-R65. In wheels possessing belt construction F constructed and tested, total belt weight was 3.2 kg., comprising 1.92 kg. R65 compound (total for two plies) and 1.28 kg. XMC compound. As with construction D, total glass content was 65% by weight. In construction F, this total was divided as 39% random (R), 20.8% directional and 5.2% directional random (DR). Presently preferred ranges for belts of construction as in D and F are about 15% to 39% random, about 4% to 11% directional random and about 19% to 40% directional, all by weight. Total glass content is preferably in the range of about 60% to 65%, with 65% being particularly preferred.

As will be appreciated from construction F in Table III, test results for this belt configuration were not as good as those for construction D (FIG. 16). This is believed to be due to a loss of lateral strength resulting from replacement of the outer-most X/DR ply in FIG. 16 with an all-random (R) ply in FIG. 17. Construction D of FIG. 16 is presently preferred. In production, it is contemplated that the separate X/DR plies will be replaced by one continuous length of strip stock (of a length not commercially available at this time). It is anticipated that wheel rims so constructed will be stronger than those heretofore tested due to elimination of potential weak spots where the separate plies are now joined end-to-end. Disc constructions of stacked SMC-R50 (test results at A and B3 in Table III) are presently preferred.

Figure 20:
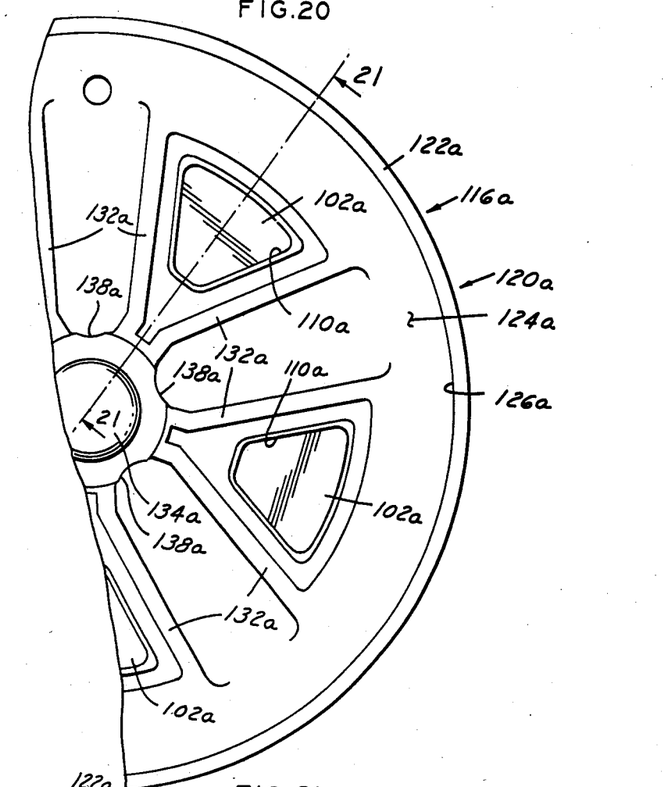
FIGS. 20-23 illustrate another embodiment of a wheel in accordance with the invention and respectively substantially correspond to FIGS. 5, 6, 8 and 9 previously described.
Figure 21:
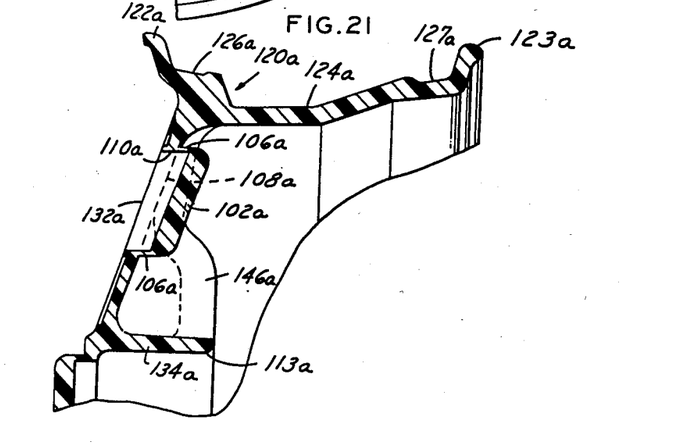
Figure 22:
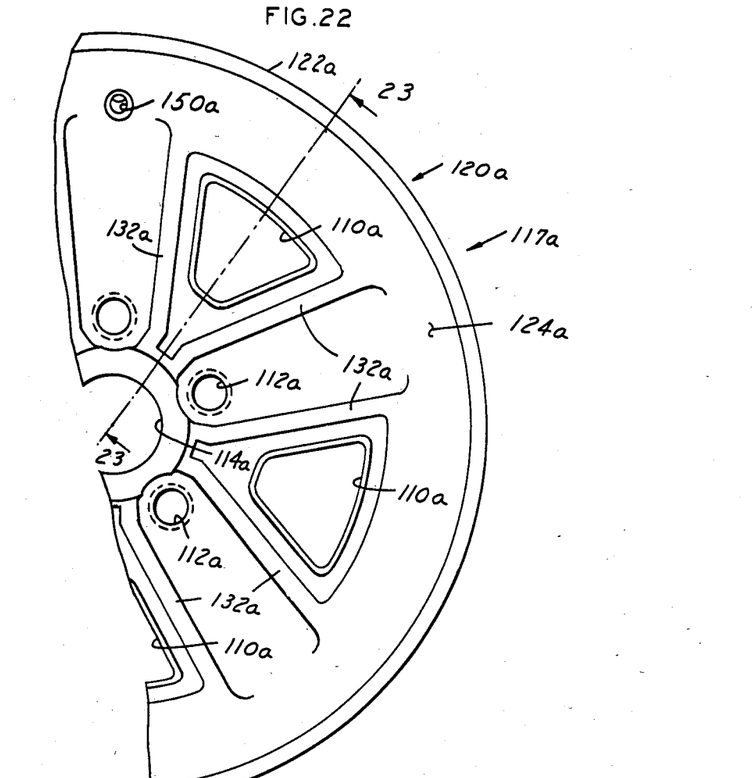
Figure 23:
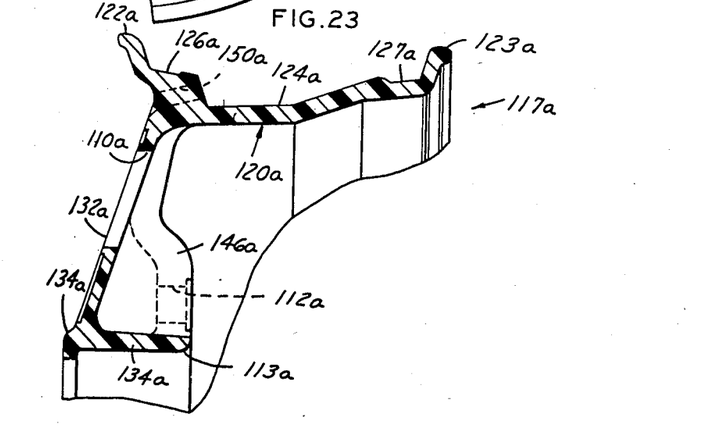

FIGS. 20–21 illustrate an alternative embodiment of a wheel constructed in accordance with the invention as molded, and FIGS. 22–23 illustrate the same wheel as finished. The wheel of FIGS. 20–23 is specifically designed from front-wheel drive vehicles and is characterized by a substantially increased disc offset as compared with the wheel of FIGS. 5–10. Elements in FIGS. 20–23 similar to elements in FIGS. 5–10 previously described in detail are indicated by corresponding reference numerals followed by the suffix "a". Pocket-connection bridging sections 106a in FIG. 21 are substantially thinner than are those at 106 in FIG. 6 which will permit pockets 102 to be broken off of the wheel disc without requiring a separate finishing operation.

In accordance with another important feature of the invention, a method of providing a quality control for inspecting directional fiber patterns in molded wheels is envisioned. This feature is accomplished by winding into the raw sheet stock and molding into the wheel directional fibers of X-ray opaque material such as barium-glass or leaded glass. Thus, in the embodiments of FIGS. 16 and 17, the quality control feature of the invention may be carried out by utilizing X-ray opaque fibers as one or more of the fibers 200 in FIG. 18. Similar modifications may be readily incorporated in the SMC process of FIG. 1. Wheels as molded and/or finished may then be sampled and examined by X-ray for inspection of the directional fiber layout.

In the following claims, the term "directional fibers" refers to fibers of controlled orientation in the raw sheet molding stock and, thus, essentially controllable orientation in the molded wheel. Fibers 30 and 52 (FIG. 1) and 222 (FIG. 18) are examples of directional fibers as previously discussed in detail. The term "random fibers" refers to fibers oriented substantially randomly in at least one plane, as at 24 in FIG. 1. "Directional-random fibers" refers to random fibers controlled during the process of fabricating the sheet molding compound so as to be oriented substantially in a given direction, as at 220 in FIG. 18. All directional terms are with reference to the axis of a finished wheel unless otherwise indicated.

The specific belt constructions illustrated in FIGS. 14–17 and discussed hereinabove are the subject of the copending application Ser. No. 119,141 of James A. Woelfel filed concurrently herewith and assigned to the assignee hereof, now U.S. Pat. No. 4,294,490.

The invention claimed is:

1. In a compression mold for forming a resin vehicle wheel and comprising rim mold sections radially reciprocal with respect to a central mold axis and disc mold sections cooperable with said rim mold sections to form a mold cavity, the improvement wherein said disc mold sections are both reciprocal as respective unitary structures axially and substantially simultaneously with respect to each other between closed portions for forming said cavity and open positions for ejecting a molded wheel, said disc mold sections being spaced apart throughout their extent when in said closed position such as to form an imperforate disc.

2. A compression mold for forming a resin wheel including integral rim and disc and having bead retaining flanges at axial ends of said rim comprising first radially reciprocable mold sections having mold surfaces defining radially outward rim forming surfaces of a mold cavity, second axially reciprocal mold sections having mold surfaces defining disc forming portions of said mold cavity and cooperable with opposing surfaces of said first mold sections for forming portions of said rim including said flanges, first means supporting said first mold sections for reciprocation relative to said axis, second means mounting said second mold section for unitary reciprocation axially with respect to each other and means coupled to said first and second mold sections for reciprocating all of said mold sections between open and closed positions, said second mold sections being spaced apart throughout their extent in fully closed positions such as to form a wheel with an imperforate disc.

3. The mold set forth in claim 2 for forming a resin vehicle wheel including integral rim and disc portions wherein said second mold sections include first surface portions which cooperate with said first mold sections for forming said rim portion and second surface portions which cooperate with each other for forming said disc portion.

4. The mold set forth in claim 3 for forming a vehicle wheel with a disc having a spoked appearance wherein said second surface portions include means for forming pockets as an integral part of said disc portion and adapted for removal to form openings in said disc so as to lend a spoked appearance to said disc and wheel.

5. A compression mold for forming a resin vehicle wheel construction including integral rim and disc portions with at least one bead retaining flange integrally projecting from an axial end of said rim portion, said mold comprising a first pair of mold sections radially reciprocal relative to one another perpendicularly to a central mold axis corresponding to the axis of said wheel construction and having radially opposing first mold surfaces defining a peripheral rim surface of said wheel construction, a second pair of mold sections each reciprocal parallel to said axis having axially opposed second mold surfaces, peripheral portions of said second mold surfaces cooperable with said first mold surfaces to form a mold cavity for said rim portion including said bead retaining flange and central portions of said second mold surfaces cooperable with each other to form a mold cavity for said disc portion, each of said second pair of mold sections being of unitary structure such that said peripheral and central surface portions are reciprocal simultaneously relative to one another, and means coupled to said first and second pairs of mold sections for reciprocating said mold sections between open and closed portions relative to each other, said second pair of mold sections being spaced apart throughout their extent when in a fully closed position such as to form a imperforate wheel disc therebetween.

6. The mold set forth in claim 5 for forming a vehicle wheel with a disc having a spoked appearance wherein said second surfaces include means for forming pockets as an integral part of said disc portion and adapted for removal to form openings in said disc so as to lend a spoked appearance to said disc and wheel.

* * * * *